(12) United States Patent
Mozes et al.

(10) Patent No.: US 10,462,687 B2
(45) Date of Patent: Oct. 29, 2019

(54) METHOD AND DEVICE FOR ESTIMATING INTERFERENCE IN A RECEIVE SIGNAL

(71) Applicant: Intel IP Corporation, Santa Clara, CA (US)

(72) Inventors: Yanai Mozes, Haifa (IL); Miki Genossar, Modiin (IL); Yuval Lomnitz, Herzelia (IL)

(73) Assignee: Intel IP Corporation, Santa Clara, CA (US)

( * ) Notice: Subject to any disclaimer, the term of this patent is extended or adjusted under 35 U.S.C. 154(b) by 1007 days.

(21) Appl. No.: 14/660,187

(22) Filed: Mar. 17, 2015

(65) Prior Publication Data

US 2015/0281987 A1   Oct. 1, 2015

(30) Foreign Application Priority Data

Mar. 28, 2014  (DE) .................. 10 2014 104 349

(51) Int. Cl.
*H04W 24/08*   (2009.01)
*H04L 5/00*    (2006.01)
(Continued)

(52) U.S. Cl.
CPC ........... *H04W 24/08* (2013.01); *H04J 11/004* (2013.01); *H04J 11/0066* (2013.01);
(Continued)

(58) Field of Classification Search
CPC ............... H04L 27/2613; H04L 5/0053; H04L 27/2692; H04L 5/0048; H04L 5/0023;
(Continued)

(56) References Cited

U.S. PATENT DOCUMENTS 8,854,756 B1 *  10/2014  Song .................... G11B 5/6076
                                                 360/31
2011/0065408 A1 *  3/2011  Kenington .......... H04B 1/1036
                                                 455/303
(Continued)

FOREIGN PATENT DOCUMENTS

CN    1322074 A    11/2001
CN    1946005 A     4/2007
(Continued)

OTHER PUBLICATIONS

Office Action dated Nov. 6, 2014 for German Patent Application No. 102014104349.9.
(Continued)

*Primary Examiner* — David C Payne
*Assistant Examiner* — Sarah Hassan
(74) *Attorney, Agent, or Firm* — Schiff Hardin LLP

(57) ABSTRACT

A method (700) includes receiving (701) a receive signal (x[n]) comprising a periodic data signal component (r[n]) and a periodic interference signal component (s[n]); determining (702) an average value by averaging over sub-samples of the receive signal (x[n]), wherein the average value is independent of at least one sub-sample of the receive signal (x[n]) having a same phase as a particular sample ([n]) of the receive signal (x[n]); and determining (703) for the particular sample ([n]) of the receive signal (x[n]) an estimate (ŝ[n]) of the interference signal component (s[n]) based on the average value.

21 Claims, 8 Drawing Sheets

(51) Int. Cl.
  *H04L 27/26* (2006.01)
  *H04W 56/00* (2009.01)
  *H04J 11/00* (2006.01)
  *H04W 84/12* (2009.01)
(52) U.S. Cl.
  CPC ........ *H04L 5/0053* (2013.01); *H04L 27/2643* (2013.01); *H04L 27/2656* (2013.01); *H04W 56/001* (2013.01); *H04W 84/12* (2013.01)
(58) Field of Classification Search
  CPC ............. H04L 27/2646; H04L 27/2647; H04L 2027/0026; H04L 27/2643; H04L 5/0062
  USPC .......................................... 375/260; 370/329
  See application file for complete search history.

(56) References Cited

U.S. PATENT DOCUMENTS

| | | | | |
|---|---|---|---|---|
| 2012/0051410 | A1* | 3/2012 | Flowers | H04B 3/32 375/222 |
| 2013/0023225 | A1* | 1/2013 | Weber | G01S 7/023 455/296 |
| 2013/0208604 | A1* | 8/2013 | Lee | H04L 25/0226 370/252 |
| 2013/0266098 | A1 | 10/2013 | McKown | |
| 2014/0105258 | A1* | 4/2014 | Nienaber | H04B 1/0003 375/219 |
| 2015/0137865 | A1* | 5/2015 | Tohzaka | H03L 7/06 327/163 |

FOREIGN PATENT DOCUMENTS

| | | |
|---|---|---|
| CN | 102257734 A | 11/2011 |
| CN | 103442374 A | 12/2013 |
| EP | 1649714 A1 | 4/2006 |
| WO | WO-2004/075590 A1 | 9/2004 |
| WO | WO-2010/070069 A1 | 6/2010 |

OTHER PUBLICATIONS

Office Action dated Mar. 30, 2016 for Taiwan Patent Application No. 104104742 (with English translation).

Office Action dated Sep. 5, 2017 for Chinese Patent Application No. 201510089387.7.

\* cited by examiner

METHOD AND DEVICE FOR ESTIMATING INTERFERENCE IN A RECEIVE SIGNAL

FIELD

The disclosure relates to methods and devices for estimating interference in a receive signal comprising a periodic data signal component and a periodic interference signal component. The disclosure further relates to mitigating a periodic interference (or spurs) in the presence of a periodic desired data signal. Specifically, the disclosure may relate to WiGig (IEEE 802.11 ad standard) and DMG (Directional Multi Gigabit) receivers, in particular with respect to Control PHY, Single-Carrier PHY and OFDM.

BACKGROUND

Many analog designs may suffer from periodic interference from spurious signals. The spurious signal source may be a HW clock leakage or any not-deliberately injected harmonic signal. The periodic interference can significantly affect the performance of detection, estimation and decoding algorithms. Removing the periodic interference may become more complicated when the data signal (i.e. the desired signal) is periodic (e.g. a preamble field of IEEE 802.11ad), and the fundamental frequency of the interference is a harmonic of the fundamental frequency of the desired signal. It may thus be desirable to provide a technique for estimating the periodic interference in order to mitigate the interference component in the receive signal.

BRIEF DESCRIPTION OF THE DRAWINGS

The accompanying drawings are included to provide a further understanding of aspects and are incorporated in and constitute a part of this specification. The drawings illustrate aspects and together with the description serve to explain principles of aspects. Other aspects and many of the intended advantages of aspects will be readily appreciated as they become better understood by reference to the following detailed description. Like reference numerals designate corresponding similar parts.

DETAILED DESCRIPTION

Figure 1:
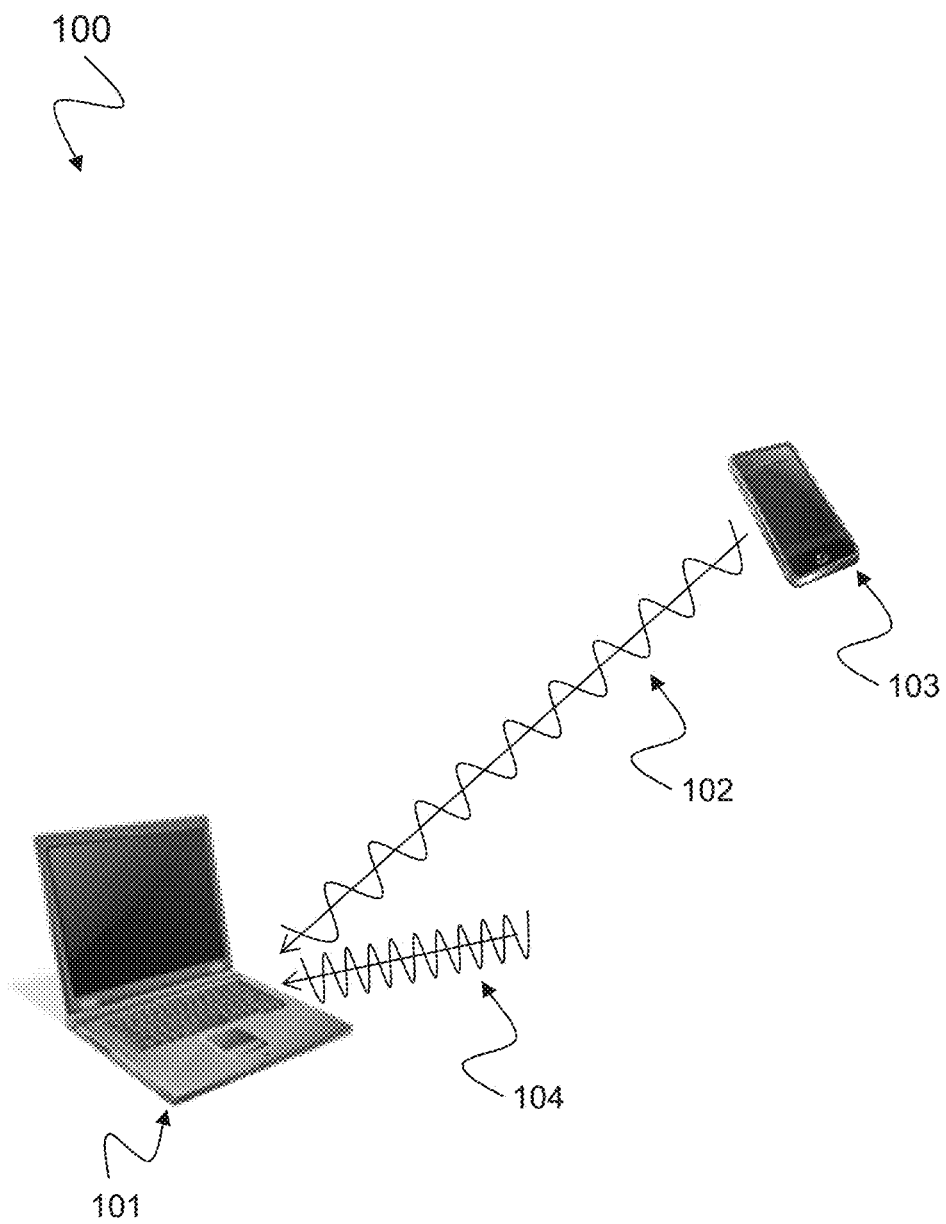
FIG. 1 is a schematic diagram illustrating a mobile communication network 100 distorted by periodic interference (spurs).

In the following detailed description, reference is made to the accompanying drawings, which form a part thereof, and in which is shown by way of illustration specific aspects in which the invention may be practiced. It is understood that other aspects may be utilized and structural or logical changes may be made without departing from the scope of the present invention. The following detailed description, therefore, is not to be taken in a limiting sense, and the scope of the present invention is defined by the appended claims.

The following terms, abbreviations and notations will be used herein.

spur: spurious signal or periodic interference signal,
PHY: physical interface device,
WiGig: Wireless Gigabit Alliance (promoting IEEE 802.11 ad Protocol),
IEEE
802.11ad: WiGig protocol allows devices to communicate wireless at multi-gigabit speeds,
DMG: Directional Multi Gigabit as defined by IEEE 802.11 ad,
DC: DC component of a signal is the non-fluctuating component of a signal or its component at frequency zero,
OFDM: Orthogonal Frequency Division Multiplex.

The methods and devices described herein may relate to receive signals comprising periodic signal and periodic spur components and further may be based on subsampling the receive signal and averaging specific sub-samples of the receive signal. It is understood that comments made in connection with a described method may also hold true for a corresponding device configured to perform the method and vice versa. For example, if a specific method step is described, a corresponding device may include a unit to perform the described method step, even if such a unit is not explicitly described or illustrated in the figures. Further, it is understood that the features of the various exemplary aspects described herein may be combined with each other, unless specifically noted otherwise.

The methods and devices described herein may be implemented in wireless communication networks, in particular communication networks based on mobile communication standards such as WiFi, WiGig (IEEE 802.11 ad) and DMG (Directional Multi Gigabit). The WiGig specification allows devices to communicate without wires at multi-gigabit speeds. WiGig tri-band enables devices operating in the 2.4, 5 and 60 GHz bands deliver data transfer rates up to 7 Gbit/s while being compatible with Wi-Fi devices. Wi-Fi (Wireless Fidelity) is a technology that allows an electronic device to exchange data or connect to the internet wirelessly using radio waves. Methods and devices described herein may be implemented in personal computers, video-game consoles, smartphones, digital cameras, tablet computers, digital audio players, etc. These can connect to a network resource such as the Internet via a wireless network access point using the WiFi or WiGig specification. The methods and devices described herein may make use of the (in most countries unlicensed) 60 GHz band as defined by the IEEE 802.11ad standard. The methods and devices described herein may support the ISM band around 60 GHz, i.e. the four channels defined for this band located around 58.32 GHz, 60.48 GHz, 62.64 GHz and 64.80 GHz.

The Directional Multi-Gigabit (DMG) specification of the IEEE 802.11 ad standard provides three different modulation modes using different PHYs: a Control PHY, a Single Carrier PHY and an OFDM PHY. All DMG PHYs use the same packet structure, but may differ in how the individual fields are defined as well as in the coding and modulation that is used. A packet or data frame may be made up of the following common parts: a preamble that may include a short training field (STF), which is an example of a periodic sequence and a channel estimation field (CE), a header including information such as the modulation mode (MCS), the length of the data field or a checksum, a data field variable in length used to transmit the payload data with different modulations (MCS) and an optional training for beamforming (TRN) field that may include beamforming information, which is a further example of a periodic sequence. Individual fields of the packets may be coded by Golay sequences. The methods and devices described herein may be implemented with each packet structure defined by DMG and IEEE 802.11ad. In particular, the periodic sequences in such packet structures may be used in methods and devices as described in this disclosure for mitigating a periodic interference or spur signal in a received data packet.

The methods and devices described herein may support data rates of e.g. 7 Gbit/s providing the following modes: a single carrier mode, a single carrier low power mode and a high-performance mode with OFDM technology. The methods and devices described herein may support short wavelengths, e.g. 5 mm at e.g. 60 GHz and thus may be implemented in compact antennas and antenna arrays. The methods and devices described herein may be implemented in beamforming allowing to optimize the power at the receiver and to reduce interference during transmission. The methods and devices described herein may be backward compatible and implemented in 802.11a, b, g, n devices. The methods and devices described herein may be implemented across both bands, 2.4 GHz and 5 GHz and in the 60 GHz range, thereby supporting tri-band devices. The methods and devices described herein may process video signals such as 3D high definition video streams, e.g. video streams of 4 k resolution and 48 frames per second.

Methods and devices described herein may be further implemented in a base station (NodeB, eNodeB) or a mobile device (or mobile station or User Equipment (UE)). The described devices may include integrated circuits and/or passives and may be manufactured according to various technologies. For example, the circuits may be designed as logic integrated circuits, analog integrated circuits, mixed signal integrated circuits, optical circuits, memory circuits, integrated passives, etc.

The methods and devices described in this disclosure may be implemented in any device using synchronization or pilot patterns that are repeated several times and therefore are periodic signals. These patterns may comprise a preamble in a wireless protocol such as WiFi or WiGig as described above. These patterns may comprise a reference signal that may be repeated multiple times, thereby forming a periodic signal. A periodic signal or sequence may refer to any signal or sequence the samples of which are repeated several (at least two) times. It is not limited to a sine shape, it can be any signal shape transmitting a sequence of samples over more than one period.

The methods and devices described herein may be configured to transmit and/or receive radio signals. Radio signals may be or may include radio frequency signals radiated by a radio transmitting device (or a radio transmitter or a sender) with a radio frequency lying in a range of about 3 Hz to about 300 GHz. The frequency range may correspond to frequencies of alternating current electrical signals used to produce and detect radio waves.

The methods and devices described herein may be applied in OFDM systems, e.g. such as an OFDM PHY defined in the IEEE 802.11ad standard. OFDM is a scheme for encoding digital data on multiple carrier frequencies. A large number of closely spaced orthogonal sub-carrier signals may be used to carry data. One or more sub-carriers may carry a periodic pilot signal that may be distorted by spurious signals.

The methods and devices described herein may be applied in any receiver receiving a periodic data signal interfered by spurious signals. The receiver may receive wired data signals or wireless data signals. In wired receivers the spurious signals may result from coupling of a hardware clock signal or any not-deliberately injected harmonic signal or from non-linearities generating harmonics of the periodic data signal acting as spurious signals. In wireless receivers the spurious signals may additionally result from cross-talk or signal leakage on the air interface.

The methods and devices described herein may be applied in MIMO systems and in connection with beamforming. Multiple-input multiple-output (MIMO) wireless communication systems may employ multiple antennas at the transmitter and at the receiver in order to increase system capacity and to achieve better quality of service. Methods and devices described herein may be applied for each signal component of a MIMO signal.

FIG. 1 is a schematic diagram illustrating a mobile communication network 100 that may be distorted by periodic interference (spurs). The mobile communication network 100 may include a notebook having a radio interface for receiving radio signals and for communicating with other devices such as e.g. the smartphone 103. The communication may be based on WiGig or WiFi or any other communication protocol transmitting periodic data signals over some periods of time, e.g. a preamble or a pilot sequence in the communication protocol. The periodic data signal 102 received at the radio interface of the notebook 101 may be interfered by a spur signal 104, i.e. some periodic interference signal that may result from a hardware clock leakage or any not-deliberately injected harmonic signal produced within the notebook 101 or from external. The notebook 101 may include a spur mitigation filter 200 as described below with respect to FIG. 2 for mitigating the spur signal 104. A receiver in the notebook 101 for receiving a signal from the smartphone 103 including the periodic data signal 102 and the spur signal 104 may be a receiver 300 as described below with respect to FIG. 3.

Figure 2:
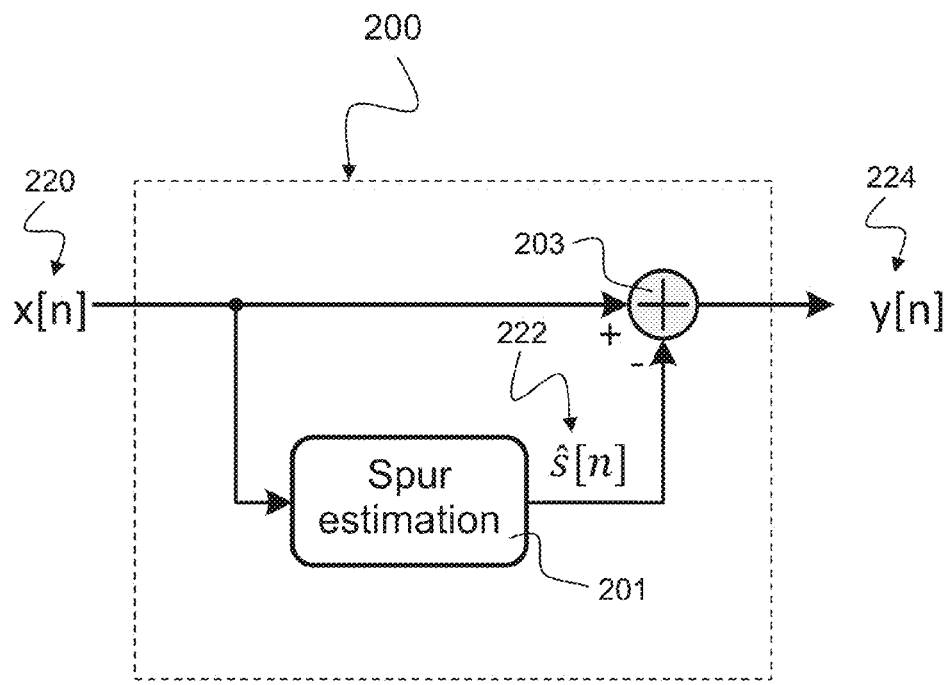
FIG. 2 is a block diagram of a spur mitigation filter 200 for mitigating periodic interference.

FIG. 2 is a block diagram of a spur mitigation filter 200 for mitigating periodic interference. The spur mitigation filter 200 may include a spur estimation circuit 201, e.g. a filter implemented in hardware or software, and a subtracting circuit 203. A receive signal x[n] 220 received at the spur mitigation filter 200, e.g. the periodic data signal 102 from the smartphone 103 interfered by the spur signal 104 as depicted in FIG. 1 may be provided to the spur estimation circuit 201 which may be designed to estimate the spur signal component s[n] 222 based on the receive signal x[n] 220. The subtracting circuit 203 may be designed to provide the difference between the receive signal x[n] 220 and the spur signal component s[n] 222 and to provide the spur-mitigated signal y[n] 224 at an output. The spur-mitigated signal y[n] 224 may be an estimate of the periodic data signal component of the receive signal 220 representing the periodic data signal 102 as depicted in FIG. 1.

The spur signal may have an integer number of N samples per period. The desired signal, i.e. the data signal, may have an integer number of M samples per period. The fundamental frequency of the spur may be a harmonic of the fundamental frequency of the desired signal according to the relation $$L = \frac{M}{N}. \quad (1)$$

Figure 3:
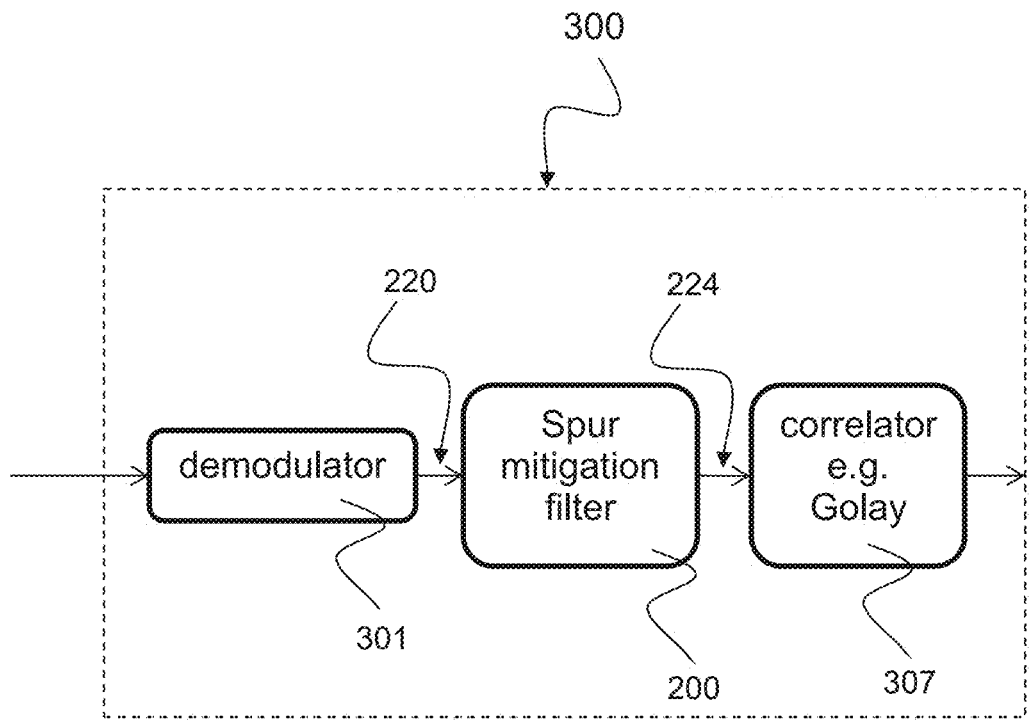
FIG. 3 is a block diagram of a receiver 300 comprising a spur mitigation filter 200 as depicted in FIG. 2.

FIG. 3 is a block diagram of a receiver 300 comprising a spur mitigation filter 200 as depicted in FIG. 2. The receiver 300 may include a demodulator 301, a spur mitigation filter 200, e.g. as described above with respect to FIG. 2 and a correlator 307, e.g. a Golay correlator that may be based on a WiGig protocol. A signal received at the receiver 300 may be demodulated by the demodulator 301 that may provide a receive signal 220, e.g. corresponding to the receive signal x[n] 220 as depicted in FIG. 2. The receive signal x[n] 220 may include a periodic data signal component and a periodic interference signal component that may be referred to as spur signal. The spur signal may be suppressed by the spur mitigation filter 200 which may provide an estimate y[n] 224 of the data signal component, i.e. the desired signal.

The desired signal may be provided by the spur mitigation filter 200 such that it does not leak into the estimated spur as described below with respect to FIGS. 4 to 8. Thus, the power of the desired signal 224 at the output of the spur mitigation filter 200 may be asymptotically identical to the power of the desired signal component at the input of the spur mitigation filter 200. There may be attenuated and shifted replicas of the desired signal. The correlator 307 following the spur mitigation filter 200 may be configured to suppress these replicas of the desired signal such that they do not affect the peak at the output of the correlator 307, since they may be not at time instants of interest. Hence, detection algorithms that make use of this peak may not suffer from degradation. In one example, the correlator may be a Golay-correlator as used in IEEE 802.11 ad for detection, frequency-offset estimation and synchronization algorithms over the preamble field.

Figure 4:
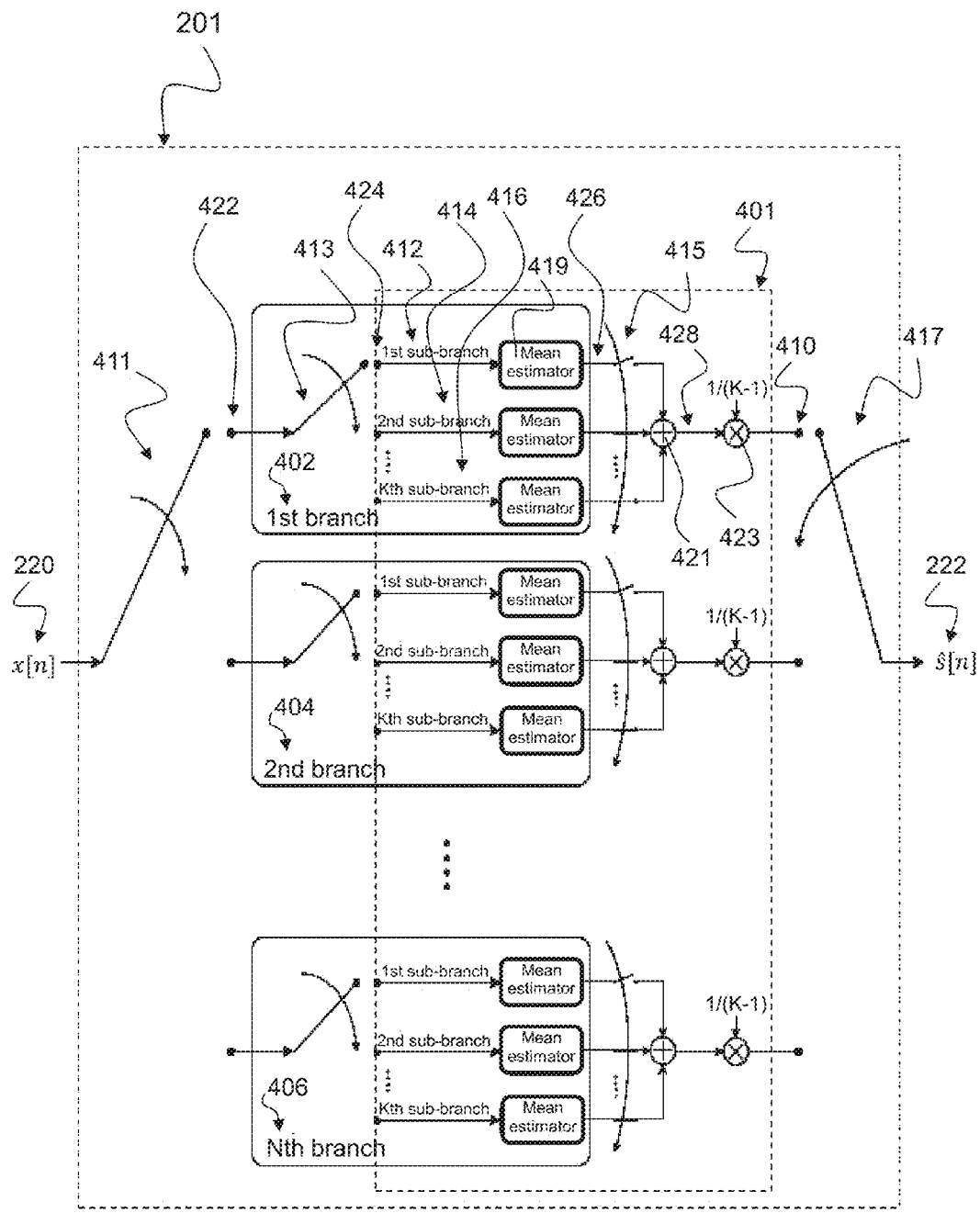
FIG. 4 is a block diagram of an (online) spur estimation filter 201 that may be used in the spur mitigation filter 200 of FIG. 2 for estimating periodic interference.

FIG. 4 is a block diagram of an (online) spur estimation filter 201 that may be used in the spur mitigation filter 200 depicted in FIG. 2 for estimating periodic interference.

The spur estimation filter 201 may include a first decimator or sub-sampler 411, e.g. implemented as a switch, for decimating or sub-sampling a receive signal x[n] 220 by a first decimation factor N providing a number of N first sub-sampled receive signals 422. The spur estimation filter 201 may include a number of N branches 402, 404, 406 or processing branches where the first sub-sampled receive signals 422 may be switched to by the first sub-sampler 411.

Each of the N branches 402, 404, 406 may include a second decimator or sub-sampler 413, e.g. implemented as a switch, for re-decimating or sub-sampling a respective first sub-sampled receive signal 422 of a branch by using a second decimation factor K and providing a number of K second sub-sampled receive signals 424. Each branch 402, 404, 406 may include a number of K sub-branches 412, 414, 416 or processing sub-branches where the second sub-sampled receive signals 424 may be switched to by the second sub-sampler 413.

For example, the first sub-sampled receive signal 422 of the first branch 402 may be sub-sampled by the second decimation factor K providing a number of K second sub-sampled receive signals 424, each one at a respective sub-branch 412, 414, 416 of the first branch 402.

Each sub-branch 412, 414, 416 of the N branches 402, 404, 406 may include a mean estimator 419 for averaging the respective second sub-sampled receive signal 424 and providing an estimate 426 of the respective second sub-sampled receive signal 424.

The spur estimation filter 201 may include a number of K third switches 415 following the N branches 402, 404, 406, a number of N adding devices 421, and a number of N multipliers 423. Each third switch 415 may be configured to switch all estimates 426 of second sub-sampled receive signals 424 provided by a respective branch 402 except for one to the adder 421 associated to the respective branch 402. The one estimate 426 of the second sub-sampled receive signal 424 not switched to the adder 421 may correspond to the one sub-sample of the receive signal 220 having the same phase as a current input sample of the receive signal 220. The adder 421 may add all estimates 426 of the second sub-sampled receive signals 424 except the one having the same phase as the input sample and may provide a sum signal 428 to the multiplier 423. The multiplier 423 may multiply the sum signal 428 by a factor of 1/(K−1) and thus may provide an averaged second sub-sampled receive signal 410.

The spur estimation filter 201 may include an interlacing unit, e.g. implemented by a fourth switch 417 that may be configured to up-sample the averaged second sub-sampled receive signals 410 of all N branches 402, 404, 406 and to provide the spur signal component s[n] 222 as an up-sampled version of the averaged second sub-sampled receive signals 410 of all N branches.

In the following, an overview over the function of the spur estimation filter 201 is provided. The spur estimation block 201 may perform a two-stage decimation. A first decimation 411 may decimate the received signal x[n] 220 into branches 402, 404, 406 according to the period of the spur, so the spur can be estimated similarly to DC estimation. A second decimation 413 may decimate the signal further into sub-branches 412, 414, 416 according to the decimated (desired) signal's period. In one example, the spur may be estimated by taking into consideration only a subset of the sub-branches such that the signal component does not leak into the estimate.

The spur estimation filter 201 may be configured to perform the following spur estimation algorithm:

Block #1: Decimate the received signal x[n] into N branches;
Block #2: Re-decimate the decimated received signal into K sub-branches;
Block #3: Estimate the spur per sub-branch;
Block #4: Estimate the spur per branch by averaging all the spur estimates, except the sub-branch which has the same phase as the input sample.

A spur mitigation filter 200 according to the description with respect to FIG. 2 may include the following block additional to the spur estimation filter 201:

Block #5: Subtract the estimated spur from the received signal.

The spur estimation filter 201 may be described by the following mathematical model. The received signal x may be given by $$x[n]=r[n]+s[n] \quad (2)$$

where r, s and n denote the periodic desired signal, spur signal and time index, respectively.

Block #1: Decimate the received signal into N branches.

$$x_{m_0}[m]=x[m \cdot N+m_0] \quad (3)$$

where m and $m_0$ denote the decimated time index and branch index $$m = \left\lfloor \frac{n}{N} \right\rfloor \quad (4)$$

$$m_0 = n \bmod N \quad (5)$$

The floor function floor(x)=⌊x⌋ of equation (4) is defined as the largest integer not greater than x. The modulo function n mod N is defined as the remainder of the Euclidean division of n by N.

Block #2: Re-decimate $x_{m_0}[m]$ into K sub-branches $$x_{m_0,k_0}[k] = x_{m_0}[k \cdot K + k_0] \quad (6)$$

where k and $k_0$ and K denote the double-decimated time index, sub-branch index and the factor of the second decimation, respectively.

$$k = \left\lfloor \frac{m}{K} \right\rfloor = \left\lfloor \frac{\left\lfloor \frac{n}{N} \right\rfloor}{K} \right\rfloor \quad (7)$$

$$k_0 = m \bmod K = \left\lfloor \frac{n}{N} \right\rfloor \bmod K \quad (8)$$

Block #3: Estimate the spur per sub-branch. Different methods may be used, e.g. offline spur mitigation as described below with respect to FIGS. 5 and 6 and online spur mitigation as depicted in FIG. 4 and described in the following. In online spur mitigation simultaneous, i.e. sample-by-sample, estimation and subtraction from the received signal may be performed. Every sample of the received signal may be processed only once where the spur estimate may be different from one period of the desired signal to the next.

$$\hat{s}_{m_0,k_0}[k] = \begin{cases} 0 & k = 0 \\ \frac{1}{k} \cdot \sum_{i=0}^{k-1} x_{m_0,k_0}[i] & k \geq 1 \end{cases} \quad (9)$$

Block #4: Estimate the spur per branch by averaging all the spur estimates of that branch, except the sub-branch which has the same phase as the input sample.

$$\hat{s}_{m_0}[m] = \frac{1}{K-1} \cdot \sum_{\substack{k_0=0 \\ k_0 \neq m \bmod K}}^{K-1} \hat{s}_{m_0,k_0}[k] =$$

$$\begin{cases} 0 & k = 0 \\ \frac{1}{K-1} \cdot \sum_{\substack{k_0=0 \\ k_0 \neq m \bmod K}}^{K-1} \frac{1}{k} \cdot \sum_{i=0}^{k-1} x_{m_0,k_0}[i] & k \geq 1 \end{cases} \text{ where } k = \left\lfloor \frac{m}{K} \right\rfloor. \quad (10)$$

Block #5 (additionally for the spur mitigation filter 200): Subtract the estimated spur from the received signal. ŝ[n] may be the spur estimate at time index n.

$$\hat{s}[n] = \hat{s}_{n \bmod N}\left[\left\lfloor \frac{n}{N} \right\rfloor\right] = \hat{s}_{m_0}[m] \quad (11)$$

The filtered signal may then be given by $$y[n] = \begin{cases} 0 & n < N \\ x[n] - \hat{s}[n] & \text{otherwise} \end{cases} \quad (12)$$

When a spur estimate is not available (n<N), the output of the spur mitigation filter 200 may be set to zero.

Substituting $x_{m_0,k_0}[i]$ with its explicit expression (assuming k≤1) yields the following expression.

$$y[n] = x[n] - \hat{s}[n] = r[n] - \frac{1}{K-1} \cdot \sum_{\substack{k_0=0 \\ k_0 \neq m \bmod K}}^{K-1} \frac{1}{k} \cdot \sum_{i=0}^{k-1} r_{m_0,k_0}[i] \quad (13)$$

where $r_{m_0,k_0}[i]$ denotes the double-decimated desired signal (similar notation as s $$r_{m_0,k_0}[i] = r_{m_0}[i \cdot K + k_0] = r[(i \cdot K + k_0) \cdot N + m_0] \quad (14)$$

Equation (13) illustrates that by ignoring the m mod K sub-branch, the desired signal may not leak into the estimated spur. Thus, the power of the desired signal at the output of the spur mitigation filter 200 may be asymptotically identical to the power of the desired signal at the input of the spur mitigation filter 200. There may be attenuated and shifted replicas of the desired signal. When the spur mitigation filter 200 is followed by a correlator 307 as described above with respect to FIG. 3, these replicas may not affect the peak at the output of the correlator 307, since they may be not at time instants of interest. Thus, detection algorithms, which make use of this peak, may not suffer from degradation. In one example, corresponding to IEEE 802.11 ad, a Golay-correlator may be used for detection, frequency-offset estimation and synchronization algorithms over the preamble field.

Blocks #1 to #5 may be performed by using a method 700 as described below with respect to FIG. 7. Blocks #1 to #5 may be performed by using a method 800 as described below with respect to FIG. 8.

The spur estimation filter 201 may be implemented in a device, e.g. a spur mitigation filter 200 as described above with respect to FIG. 2 or a receiver 300 as described above with respect to FIG. 3. The device 200, 300 may be configured to receive a receive signal x[n] comprising a periodic data signal component r[n] and a periodic interference signal component s[n]. The device 200, 300 may include a unit 401 configured to determine an average value 410 by averaging over sub-samples of the receive signal x[n], wherein the average value 410 may be independent of at least one sub-sample of the receive signal x[n] having a same phase as a particular sample [n] of the receive signal x[n], and a unit 417 configured to determine for the particular sample [n] of the receive signal x[n] an estimate s[n] 222 of the interference signal component s[n] based on the average value 410.

The device 200, 300 may include a unit 203 configured to subtract the estimate s[n] of the interference signal component s[n] from the particular sample [n] of the receive signal x[n] to provide an interference-mitigated receive signal y[n]. The device 200, 300 may include a correlator 307 configured to correlate the interference-mitigated receive signal y[n] with a correlation sequence, for example a Golay sequence.

The device may include a first number N of branches, wherein the first number N may correspond to a first number N of samples per period of the interference signal component s[n], and a first switch configured to switch the receive signal x[n] into the first number N of branches to provide a first number N of first sub-sampled receive signals.

Each of the first number N of branches may include a second number K of sub-branches, and a second switch configured to switch the first sub-sampled receive signal of the respective branch into the second number K of sub-branches to provide a second number K of second sub-sampled receive signals. Each of the second number K of sub-branches may include an averaging circuit configured to provide an average of the second sub-sampled receive signal switched to the respective sub-branch. Each of the first number N of branches may include a unit 421 configured to add all averages provided by the sub-branches of the respective branch except an average corresponding to the second sub-sampled receive signal having a same phase as the particular sample [n] of the receive signal x[n]. Each of the first number N of branches may include a multiplier 423 multiplying the results of the respective adding units 421 by an inverse of the number of sub-branches K minus 1 providing an average per branch corresponding to the average value 410 per branch. The unit 417 may be an up-sampler for up-sampling the average values 410 per branch to provide the estimate s[n] 222 of the interference signal component s[n].

Figure 5:
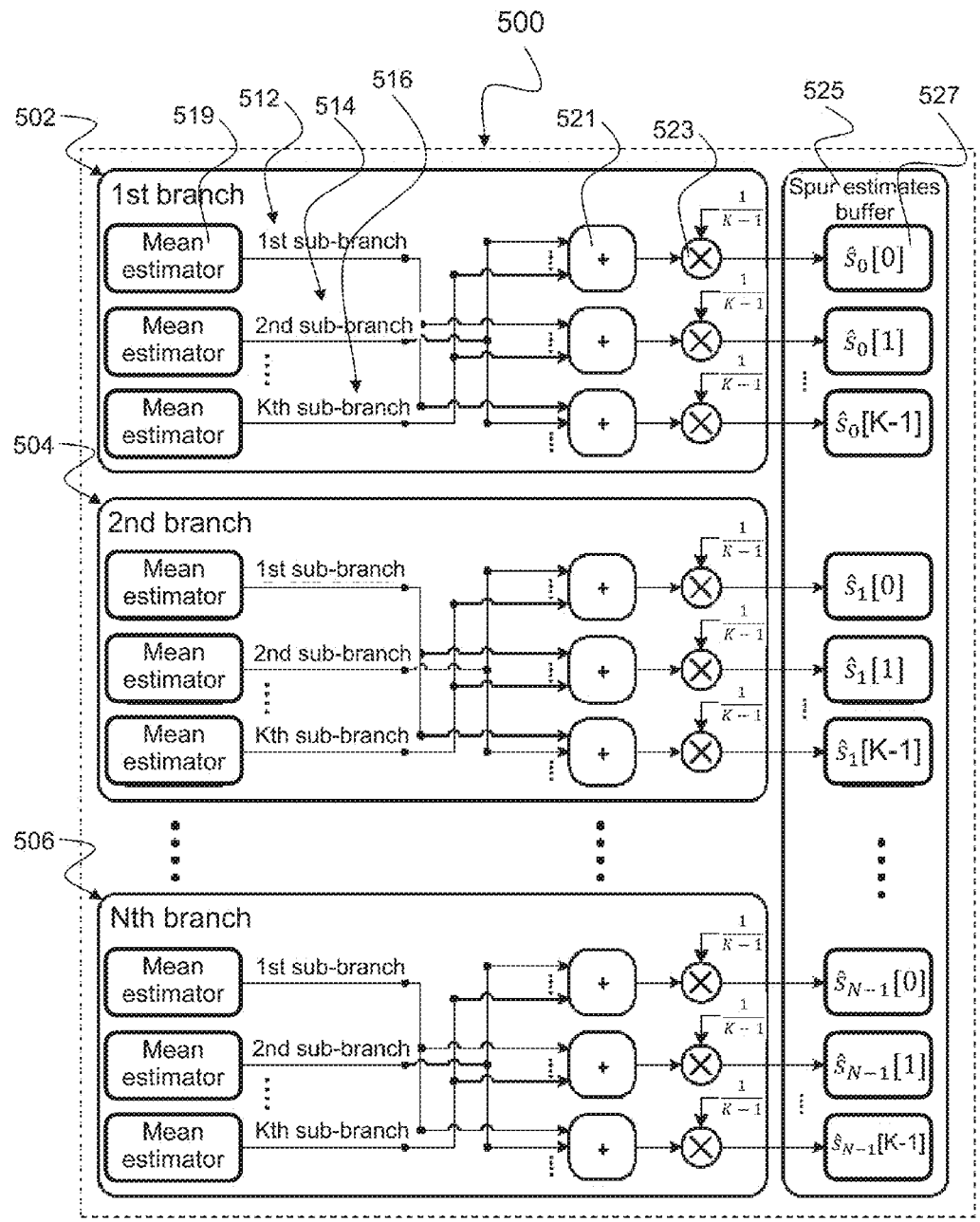
FIG. 5 is a block diagram of an (offline) spur estimation filter 500 comprising a spur estimates buffer 525 for storing spur estimates.

FIG. 5 is a block diagram of an (offline) spur estimation filter 500 including a spur estimates buffer 525 for storing the spur estimates. The spur estimation filter 500 may include an integer number of N branches 502, 504, 506, wherein each of them may include a number of K sub-branches 512, 514, 516. Each sub-branch may include a mean estimator 519. The sub-sampling of the receive signal x[n] 220 and switching to the respective sub-branches 512, 514, 516 may be based on the description above with respect to FIG. 4 for the online spur estimation filter 201. The mean estimators 519 may correspond to the mean estimators 419 as described above with respect to FIG. 4.

Each branch of the spur estimation filter 500 may include a number of K adding devices 521, a number of K multipliers 523 and a number of K spur estimates buffer cells 527 which may be arranged in the spur estimates buffer 525. Each second sub-sampled receive signal except for one may be provided by a mean estimator 519 of a respective sub-branch to the adder 521 associated to the respective sub-branch. The one second sub-sampled receive signal not provided to the adder 521 may correspond to the one sub-sample of the receive signal 220 having the same phase as the input sample of the receive signal 220 as processed by the respective mean estimator 519. For example, the adder 521 associated to the first sub-branch 512 of the first branch 502 may add all signals provided by the second 514 to the K-th 516 sub-branches of the first branch 502 except the signal provided by the first sub-branch 512 of the first branch 502. The sum signal provided by the respective adder 521 may be provided to the multiplier 523 of the respective sub-branch. The multiplier 523 of a respective sub-branch may multiply the respective sum signal by a factor of 1/(K−1) and may provide the result to a respective cell 527 of the spur estimates buffer 525.

For offline spur estimation, the spur estimation filter 500 may perform the same spur estimation algorithm as described above with respect to FIG. 4 illustrating the online spur estimation. That is, the spur estimation filter 500 may be configured to perform the following algorithm:
Block #1: Decimate the received signal x[n] into N branches;
Block #2: Re-decimate the decimated received signal into K sub-branches;
Block #3: Estimate the spur per sub-branch;
Block #4: Estimate the spur per branch by averaging all the spur estimates, except the sub-branch which has the same phase as the input sample.

A spur mitigation filter 200 according to the description with respect to FIG. 2 may include the following block additional to the spur estimation filter 201:
Block #5: Subtract the estimated spur from the received signal.

While the blocks #1 and #2 may be identical as described above with respect to FIG. 4 for online spur estimation, the blocks #3, #4 and #5 may be implemented in a different manner as described in the following.

Block #3: Estimate the spur per sub-branch. It is very similar to the online spur mitigation approach, except the time index k which can be omitted since the spur is estimated over all the samples.

$$\hat{s}_{m_0,k_0} = \frac{1}{k} \cdot \sum_{i=0}^{k-1} x_{m_0,k_0}[i] \tag{15}$$

where k is the number of all available samples per sub-branch. All other notations are as previously defined.

Block #4: Calculate the set of spur estimates per branch. Every branch may have K spur estimates. The $k_0$-th spur estimate of a certain branch may be calculated by averaging all the outputs of the mean-estimators, excluding the output of the mean-estimator of the $k_0$th sub-branch. All N K spur estimates may be saved in a buffer.

$$\hat{s}_{m_0}[k_0] = \frac{1}{K-1} \cdot \sum_{\substack{l=0 \\ l \neq k_0}}^{K-1} s_{m_0,l} = \frac{1}{K-1} \cdot \sum_{\substack{l=0 \\ l \neq k_0}}^{K-1} \frac{1}{K} \cdot \sum_{i=0}^{k-1} x_{m_0,l}[i] \tag{16}$$

All notations are as previously defined above with respect to FIG. 4.

Blocks #1 to #5 may be performed by using a method 700 as described below with respect to FIG. 7. Blocks #1 to #5 may be performed by using a method 800 as described below with respect to FIG. 8.

Figure 6:
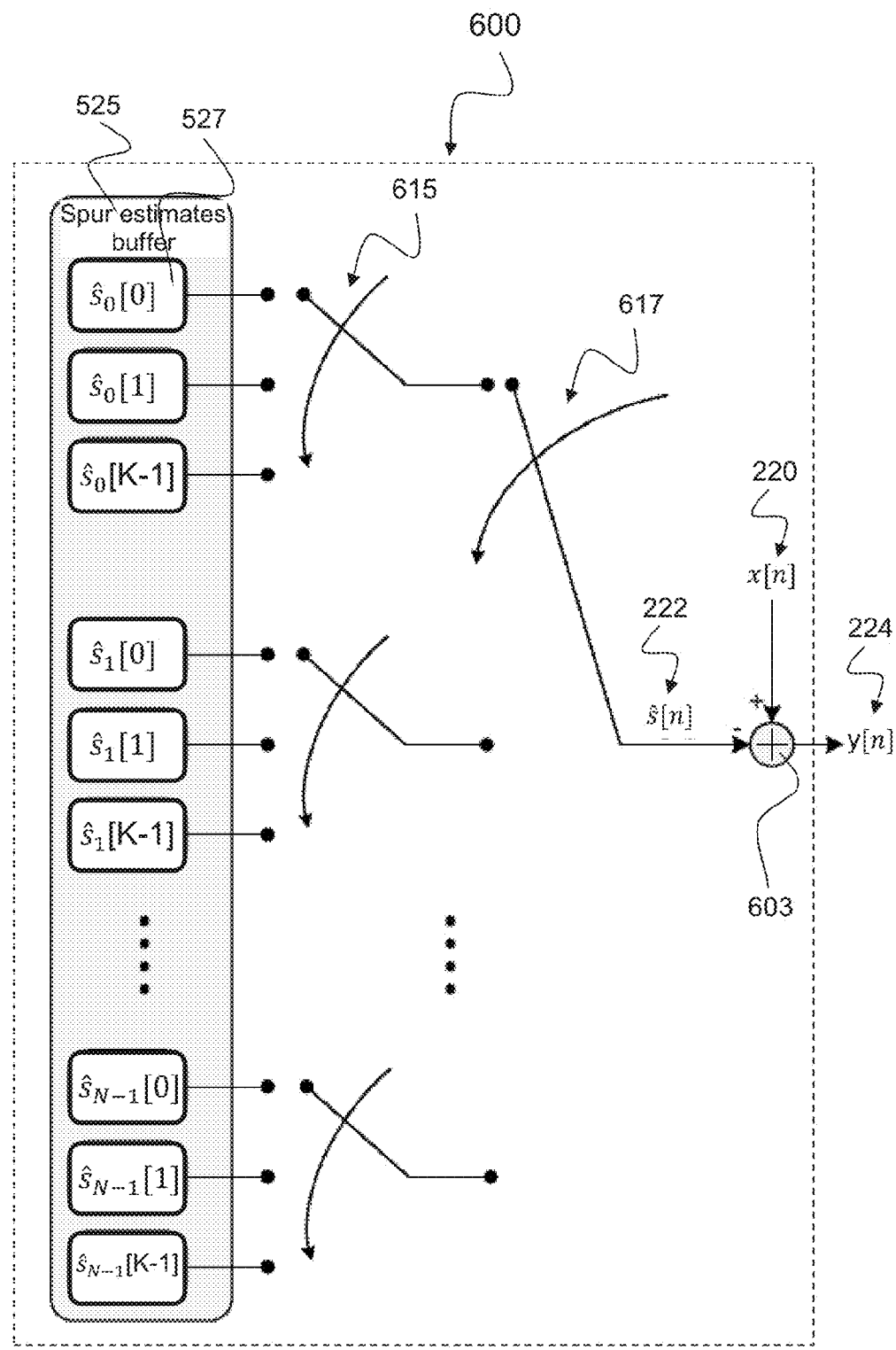
FIG. 6 is a block diagram of an (offline) spur correction filter 600 that may use the spur estimates buffer 525 of FIG. 5 for mitigating periodic interference.

FIG. 6 is a block diagram of an (offline) spur correction filter 600 that may use the spur estimates buffer 525 depicted in FIG. 5 for mitigating periodic interference.

The spur correction filter 600 may include a spur estimates buffer 525 that may include a number of K times N cells, i.e. K cells for each branch, corresponding to the spur estimates buffer 525 described above with respect to FIG. 5.

The spur correction filter 600 may include a number of K first interlacing units 615, i.e. one first interlacing unit per sub-branch for interlacing the spur estimates stored in the spur estimates buffer 525 by a first interpolation factor of K. The spur correction filter 600 may include a second interlacing unit, e.g. implemented by a switch 617 that may be configured to up-sample the interpolated spur estimates provided by the first interlacing units 615 of all N branches and to provide the estimated spur signal component ŝ[n] 222.

The spur correction filter 600 may include a subtraction circuit 603 for subtracting the estimated spur signal component ŝ[n] 222 from the receive signal x[n] 220 to provide the filtered output signal y[n] 224 that may correspond to the spur mitigated receive signal.

The spur correction filter 600 may perform Block #5 of the spur mitigation algorithm as described above with respect to FIG. 5 as follows:
Block #5: Subtract the estimated spur from the received signal.
ŝ[n] may be the spur estimate at time index n.

$$\hat{s}[n] = \hat{s}_{n \bmod N}\left[\left\lfloor \frac{n}{N} \right\rfloor \bmod K\right] = \hat{s}_{m_0}[k_0] \tag{17}$$

The filtered signal y[n] may then be given by $$y[n]=x[n]-\hat{s}[n] \qquad (18)$$

Figure 7:
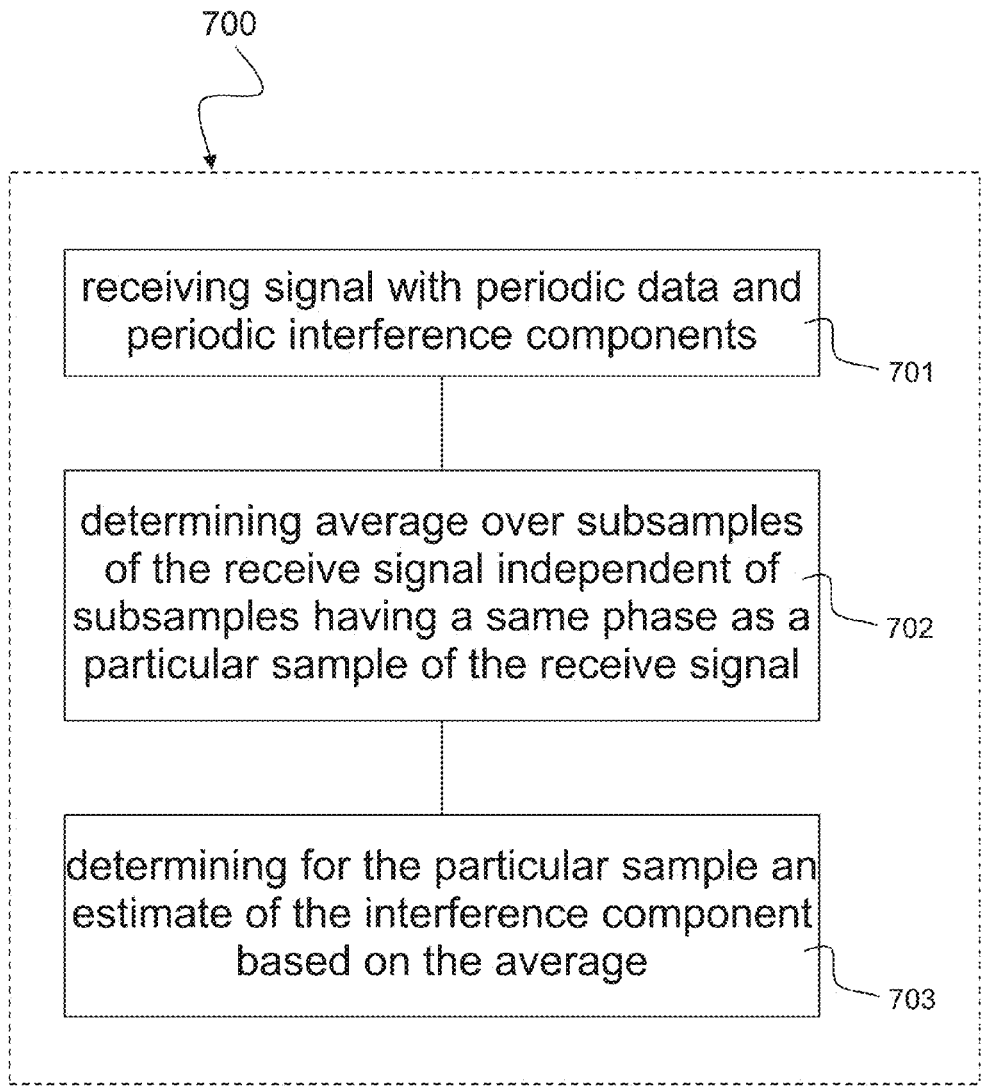
FIG. 7 is a schematic diagram illustrating a method 700 for estimating a periodic interference signal component of a receive signal.

FIG. 7 is a schematic diagram illustrating a method 700 for estimating a periodic interference signal component of a receive signal.

The method 700 may include receiving 701 a receive signal comprising a periodic data signal component and a periodic interference signal component, e.g. as described above with respect to FIGS. 1 to 3. The method 700 may include determining 702 an average value by averaging over sub-samples of the receive signal, wherein the average value is independent of at least one sub-sample of the receive signal having a same phase as a particular sample of the receive signal, e.g. as described above with respect to FIGS. 4 to 6. The method 700 may include determining 703 for the particular sample of the receive signal an estimate of the interference signal component based on the average value, e.g. as described above with respect to FIGS. 4 to 6.

In one example, the method 700 may further include subtracting the estimate of the interference signal component from the particular sample of the receive signal. In one example of the method 700, a period of the periodic interference signal component may be smaller than a period of the periodic data signal component. In one example of the method 700, an integer multiple of a period of the interference signal component may equal a period of the data signal component. In one example of the method 700, a fundamental frequency of the interference signal component may be a harmonic of a fundamental frequency of the data signal component. In one example, the method 700 may further include sub-sampling the receive signal based on a first sub-sampling factor to provide first sub-samples of the receive signal. In one example of the method 700, the interference signal component may include a first number N of samples per period and the first sub-sampling factor may correspond to the first number N of samples per period. In one example of the method 700, sub-sampling the receive signal may be performed at different phases of the receive signal to provide a plurality of first sub-samples of the receive signal. In one example, the method 700 may include sub-sampling the first sub-samples of the receive signal based on a second sub-sampling factor K to provide second sub-samples of the receive signal.

In one example of the method 700, the interference signal component may include a first number N of samples per period and the data signal component may include a second number M of samples per period, the second sub-sampling factor K may correspond to a ratio L of the second number M of samples of the data signal component per period to the first number N of samples of the interference signal component per period or to a divisor of said ratio L.

In one example of the method 700, averaging over the sub-samples of the receive signal may be based on the second sub-samples of the receive signal.

In one example of the method 700, the data signal component may include a preamble field of a data packet or of a control packet. In one example of the method 700, at least the data signal component of the receive signal may be coded according to one of the following standards: IEEE 802.11ad, WiGig, and DMG (Directional Multi Gigabit). In one example, the method 700 may further comprise at least one of the following tasks based on the interference-mitigated receive signal: frame detection, frequency offset estimation, and synchronization. In one example of the method 700, the estimate s[n] of the interference signal component s[n] may be determined such that leakage of the data signal component r[n] into the estimate s[n] of the interference signal component s[n] is prevented. This may be achieved by using an average value that is independent of at least one sub-sample of the receive signal having a same phase as the particular sample of the receive signal as described above with respect to FIGS. 4 to 6.

The method 700 may be implemented in Blocks #1 to #5 as described above with respect to FIGS. 4 to 6.

Figure 8:
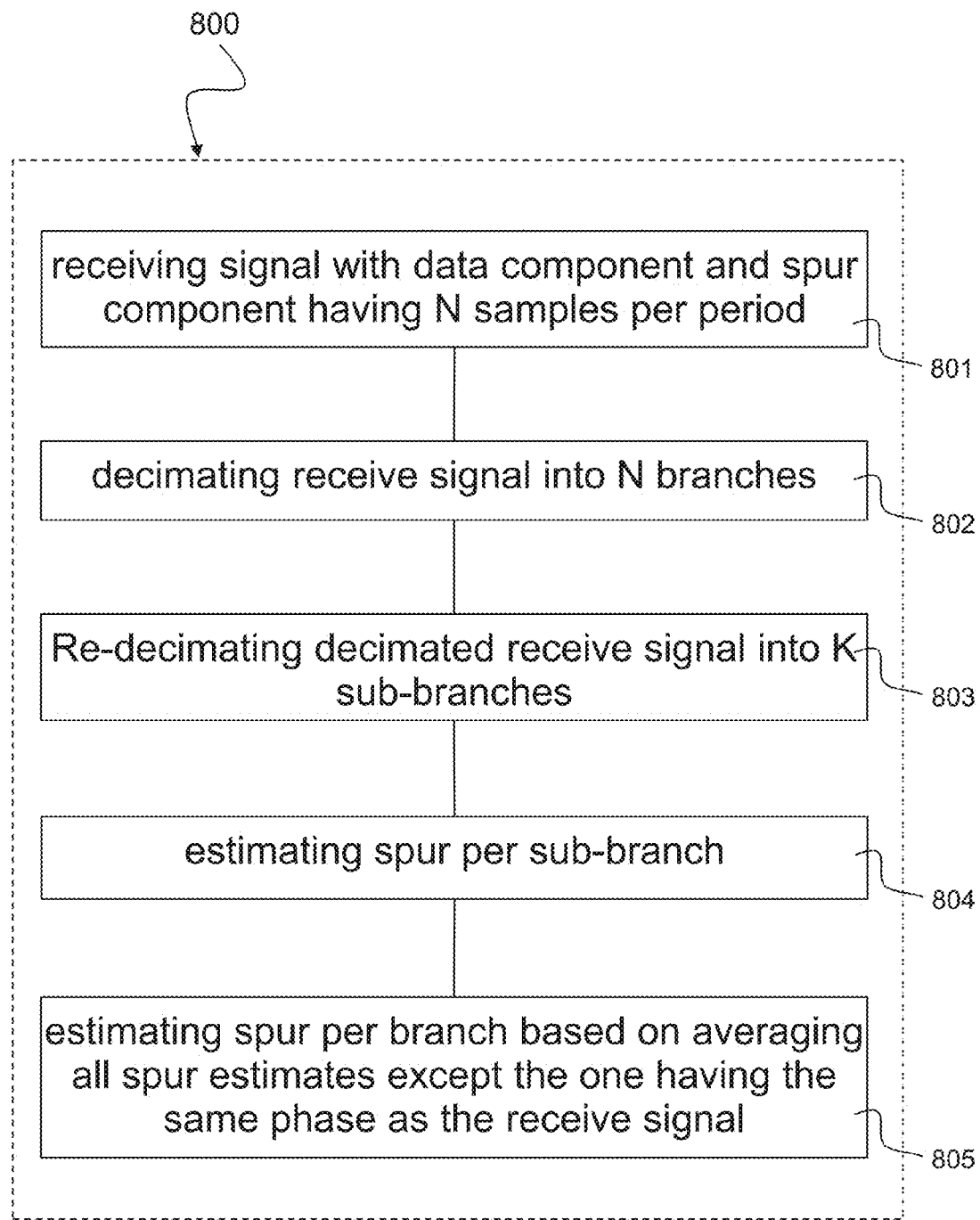
FIG. 8 is a schematic diagram illustrating a method 800 for estimating a spur based on double-decimating a receive signal comprising periodic spur and data components.

FIG. 8 is a schematic diagram illustrating a method 800 for estimating a spur based on double-decimating a receive signal comprising periodic spur and data components.

The method 800 may include receiving 801 a receive signal comprising a data signal component and a periodic spur signal component, wherein the spur signal component may comprise N samples per period as described above with respect to FIGS. 1 to 3. The method 800 may include decimating 802 the receive signal into N branches, e.g. as described above with respect to FIGS. 4 to 6 corresponding to Block #1. The method 800 may include re-decimating 803 the decimated receive signal into K sub-branches, e.g. as described above with respect to FIGS. 4 to 6 corresponding to Block #2. The method 800 may include estimating 804 the periodic spur signal component per sub-branch to provide K first spur estimates per branch, e.g. as described above with respect to FIGS. 4 to 6 corresponding to Block #3. The method 800 may include estimating 805 the periodic spur signal component per branch based on averaging all first spur estimates of the respective branch except the first spur estimate corresponding to a same phase as the receive signal, e.g. as described above with respect to FIGS. 4 to 6 corresponding to Block #4.

In one example, the method 800 may further include subtracting the estimated periodic spur signal component from the receive signal, e.g. as described above with respect to FIGS. 4 to 6 corresponding to Block #5. In one example of the method 800, estimating 804 the periodic spur signal component per sub-branch may be performed by using online spur estimation, e.g. as described above with respect to FIG. 4. In one example of the method 800, estimating 804 the periodic spur signal component per sub-branch may be performed by using offline spur estimation, e.g. as described above with respect to FIGS. 5 and 6. In one example of the method 800, estimating 804 the periodic spur signal component per sub-branch may be performed by using a filter, e.g. an FIR filter or an IIR filter.

Methods and devices as presented herein may prevent leakage of the desired signal into the estimate of the periodic interference. This may be realized by two-stage decimation of the received signal.

Methods and devices as presented herein may avoid distorting the desired signal by non-accurate estimation of the spur signal. Methods and devices as presented herein may provide receiver-operating-characteristic (ROC) curve, similar to the scenario in which there is no periodic interference, by rejecting the leakage of the desired signal into the estimated periodic interference and preventing attenuation of the desired signal. Receivers implementing methods and devices as presented herein may include a correlator as depicted in FIG. 3. In such receivers, the SNR of the peak at the output of the correlator may not significantly suffer from degradation.

The methods, systems and devices described herein may be implemented as software in a Digital Signal Processor (DSP), in a micro-controller or in any other side-processor or as hardware circuit on a chip or within an application specific integrated circuit (ASIC).

Embodiments described herein can be implemented in digital electronic circuitry, or in computer hardware, firmware, software, or in combinations thereof, e.g. in available hardware of mobile devices or in new hardware dedicated for processing the methods described herein.

The present disclosure may also support a computer program product including computer executable code or computer executable instructions that, when executed, causes at least one computer to execute the performing and computing blocks described herein, in particular the methods 700, 800 as described above with respect to FIGS. 7 and 8 and the Blocks #1 to #4 and #5 as described above with respect to FIGS. 4 to 6. Such computer program product may include a readable storage medium storing program code thereon for use by a processor, the program code comprising instructions for performing any of the methods 700, 800 or the Blocks #1 to #5 as described above.

EXAMPLES

The following examples pertain to further embodiments. Example 1 is a method, comprising: receiving a receive signal comprising a periodic data signal component and a periodic interference signal component; determining an average value by averaging over sub-samples of the receive signal, wherein the average value is independent of at least one sub-sample of the receive signal having a same phase as a particular sample of the receive signal; and determining for the particular sample of the receive signal an estimate of the interference signal component based on the average value.

In Example 2, the subject matter of Example 1 can optionally include subtracting the estimate of the interference signal component from the particular sample of the receive signal.

In Example 3, the subject matter of any one of Examples 1-2 can optionally include that a period of the periodic interference signal component is smaller than a period of the periodic data signal component.

In Example 4, the subject matter of any one of Examples 1-3 can optionally include that an integer multiple of a period of the interference signal component equals a period of the data signal component.

In Example 5, the subject matter of any one of Examples 1-4 can optionally include that a fundamental frequency of the interference signal component ($s[n]$) is a harmonic of a fundamental frequency of the data signal component.

In Example 6, the subject matter of any one of Examples 1-5 can optionally include sub-sampling the receive signal based on a first sub-sampling factor to provide first sub-samples of the receive signal.

In Example 7, the subject matter of Example 6 can optionally include that the interference signal component comprises a first number N of samples per period and the first sub-sampling factor corresponds to the first number N of samples per period; and that sub-sampling the receive signal is performed at different phases of the receive signal to provide a plurality of first sub-samples of the receive signal.

In Example 8, the subject matter of any one of Examples 6-7 can optionally include sub-sampling the first sub-samples of the receive signal based on a second sub-sampling factor K to provide second sub-samples of the receive signal.

In Example 9, the subject matter of Example 8 can optionally include that the interference signal component comprises a first number N of samples per period and that the data signal component comprises a second number M of samples per period, wherein the second sub-sampling factor K corresponds to a ratio L of the second number M of samples of the data signal component per period to the first number N of samples of the interference signal component per period or to a fraction of said ratio L.

In Example 10, the subject matter of any one of Examples 8-9 can optionally include that averaging over the sub-samples of the receive signal is based on the second sub-samples of the receive signal.

In Example 11, the subject matter of any one of Examples 1-10 can optionally include that the data signal component comprises a preamble field of a data packet or of a control packet.

In Example 12, the subject matter of any one of Examples 1-11 can optionally include that at least the data signal component of the receive signal is coded according to one of the following standards: IEEE 802.1 lad; WiGig; and DMG, Directional Multi Gigabit.

In Example 13, the subject matter of any one of Examples 1-12 can optionally include at least one of the following tasks based on the interference-mitigated receive signal ($y[n]$):
  frame detection; frequency offset estimation; and synchronization.

In Example 14, the subject matter of any one of Examples 1-13 can optionally include that the estimate of the interference signal component is determined such that leakage of the data signal component into the estimate of the interference signal component is prevented.

Example 15 is a device configured to receive a receive signal comprising a periodic data signal component and a periodic interference signal component, the device comprising: a unit configured to determine an average value by averaging over sub-samples of the receive signal, wherein the average value is independent of at least one sub-sample of the receive signal having a same phase as a particular sample of the receive signal; and a unit configured to determine for the particular sample of the receive signal an estimate of the interference signal component based on the average value.

In Example 16, the subject matter of Example 15 can optionally include a unit configured to subtract the estimate of the interference signal component from the particular sample of the receive signal to provide an interference-mitigated receive signal.

In Example 17, the subject matter of any one of Examples 15-16 can optionally include a correlator configured to correlate the interference-mitigated receive signal with a correlation sequence.

In Example 18, the subject matter of any one of Examples 15-17 can optionally include a first number N of branches, wherein the first number N corresponds to a first number N of samples per period of the interference signal component; and a first switch configured to switch the receive signal into the first number N of branches to provide a first number N of first sub-sampled receive signals.

In Example 19, the subject matter of Example 18 can optionally include that each of the first number N of branches comprises: a second number K of sub-branches; and a second switch configured to switch the first sub-sampled receive signal of the respective branch into the second number K of sub-branches to provide a second number K of second sub-sampled receive signals.

In Example 20, the subject matter of Example 19 can optionally include that each of the second number K of sub-branches comprises an averaging circuit configured to provide an average of the second sub-sampled receive signal switched to the respective sub-branch.

In Example 21, the subject matter of Example 20 can optionally include that each of the first number N of branches comprises a unit configured to add all averages provided by the sub-branches of the respective branch except an average corresponding to the second sub-sampled receive signal having a same phase as the particular sample of the receive signal.

Example 22 is a method, comprising: receiving a receive signal comprising a data signal component and a periodic spur signal component, wherein the spur signal component comprises N samples per period; decimating the receive signal into N branches; re-decimating the decimated receive signal into K sub-branches; estimating the periodic spur signal component per sub-branch to provide K first spur estimates per branch; and estimating the periodic spur signal component per branch based on averaging all first spur estimates of the respective branch except the first spur estimate corresponding to a same phase as the receive signal.

In Example 23, the subject matter of Example 22 can optionally include subtracting the estimated periodic spur signal component from the receive signal.

In Example 24, the subject matter of any one of Examples 22-23 can optionally include that estimating the periodic spur signal component per sub-branch is performed by using one of an online spur estimation and an offline spur estimation.

In Example 25, the subject matter of any one of Examples 22-24 can optionally include that estimating the periodic spur signal component per sub-branch is performed by using a filter.

Example 26 is a computer readable medium on which computer instructions are stored which when executed by a computer, cause the computer to perform the method of any one of Examples 1 to 14 and 22 to 25.

Example 27 is a receiver, configured to receive a receive signal comprising a periodic data signal component and a periodic interference signal component, the receiver comprising: a unit configured to determine an average value by averaging over sub-samples of the receive signal, wherein the average value is independent of at least one sub-sample of the receive signal having a same phase as a particular sample of the receive signal; a unit configured to determine for the particular sample of the receive signal an estimate of the interference signal component based on the average value; a unit configured to subtract the estimate of the interference signal component from the particular sample of the receive signal to provide an interference-mitigated receive signal; and a correlator configured to correlate the interference-mitigated receive signal with a correlation sequence.

In Example 28, the subject matter of Example 27 can optionally include that the correlator comprises a Golay correlator.

In Example 29, the subject matter of any one of Examples 27-28 can optionally include that the receiver comprises one of a IEEE 802.11ad receiver, a WiGig receiver, a directional multi gigabit receiver and a WiFi receiver.

In Example 30, the subject matter of any one of Examples 27-29 can optionally include that the receiver comprises at least one of the following units: a frame detector, a frequency offset estimator, and a synchronization unit.

Example 31 is a transmission system, comprising a receiver according to any one of Examples 27-30; and a transmitter configured to transmit the data signal component of the receive signal.

In Example 32, the subject matter of any one of Examples 27-31 can optionally include that the receiver comprises a hardware clock configured to generate a clock signal acting as the interference signal component of the receive signal.

In Example 33, the subject matter of any one of Examples 27-31 can optionally include that the receiver comprises a non-linear component configured to receive the data signal component of the receive signal and generating harmonics of the data signal component which harmonics act as the interference signal component of the receive signal.

In Example 34, the subject matter of Example 33 can optionally include that the non-linear component comprises a filter in a receive signal path of the receiver.

Example 35 is a device configured to receive a receive signal comprising a periodic data signal component and a periodic interference signal component, the device comprising: first determining means for determining an average value by averaging over sub-samples of the receive signal, wherein the average value is independent of at least one sub-sample of the receive signal having a same phase as a particular sample of the receive signal; and second determining means for determining for the particular sample of the receive signal an estimate of the interference signal component based on the average value.

In Example 36, the subject matter of Example 35 can optionally include a first number N of branches, wherein the first number N corresponds to a first number N of samples per period of the interference signal component; and first switching means for switching the receive signal into the first number N of branches to provide a first number N of first sub-sampled receive signals.

In Example 37, the subject matter of Example 36 can optionally include that each of the first number N of branches comprises: a second number K of sub-branches; and second switching means configured to switch the first sub-sampled receive signal of the respective branch into the second number K of sub-branches to provide a second number K of second sub-sampled receive signals.

In Example 38, the subject matter of Example 37 can optionally include that each of the second number K of sub-branches comprises averaging means for providing an average of the second sub-sampled receive signal switched to the respective sub-branch.

In Example 39, the subject matter of Example 38 can optionally include that each of the first number N of branches comprises adding means for adding all averages provided by the sub-branches of the respective branch except an average corresponding to the second sub-sampled receive signal having a same phase as the particular sample of the receive signal.

In addition, while a particular feature or aspect of the invention may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the invention may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present invention. This application is intended to cover any adaptations or variations of the specific aspects discussed herein.

The invention claimed is:

1. A method, comprising:
receiving, by a receiver, a receive signal comprising a periodic data signal component and a periodic interference signal component;
determining, by an averager, an average value by averaging over sub-samples of the receive signal, wherein the average value is independent of at least one sub-sample of the receive signal having a same phase as a particular sample of the receive signal;
determining, by an estimator, for the particular sample of the receive signal an estimate of the interference signal component based on the average value; and
subtracting, by a subtractor, the estimate of the interference signal component from the particular sample of the receive signal to provide an interference-mitigated receive signal,
wherein a period of the periodic interference signal component is smaller than a period of the periodic data signal component.

2. A method, comprising:
receiving, by a receiver, a receive signal comprising a periodic data signal component and a periodic interference signal component;
determining, by an averager, an average value by averaging over sub-samples of the receive signal, wherein the average value is independent of at least one sub-sample of the receive signal having a same phase as a particular sample of the receive signal;
determining, by an estimator, for the particular sample of the receive signal an estimate of the interference signal component based on the average value; and
subtracting, by a subtractor, the estimate of the interference signal component from the particular sample of the receive signal to provide an interference-mitigated receive signal,
wherein an integer multiple of a period of the interference signal component equals a period of the data signal component.

3. A method comprising:
receiving, by a receiver, a receive signal comprising a periodic data signal component and a periodic interference signal component:
sub-sampling the receive signal based on a sub-sampling factor to provide sub-samples of the receive signal;
determining, by an averager, an average value by averaging over the sub-samples of the receive signal, wherein the average value is independent of at least one sub-sample of the receive signal having a same phase as a particular sample of the receive signal;
determining, by an estimator, for the particular sample of the receive signal an estimate of the interference signal component based on the average value; and
subtracting, by a subtractor, the estimate of the interference signal component from the particular sample of the receive signal to provide an interference-mitigated receive signal.

4. The method of claim 3,
wherein the interference signal component comprises a first number of samples per period and the first sub-sampling factor corresponds to the first number of samples per period; and
wherein sub-sampling the receive signal is performed at different phases of the receive signal to provide a plurality of first sub-samples of the receive signal.

5. The method of claim 3, further comprising:
sub-sampling the first sub-samples of the receive signal based on a second sub-sampling factor to provide second sub-samples of the receive signal.

6. The method of claim 5,
wherein the interference signal component comprises a first number of samples per period and the data signal component comprises a second number of samples per period, and
wherein the second sub-sampling factor corresponds to a ratio of the second number of samples of the data signal component per period to the first number of samples of the interference signal component per period or to a divisor of said ratio.

7. The method of claim 5, wherein averaging over the sub-samples of the receive signal is based on the second sub-samples of the receive signal.

8. The method of one of claim 1, wherein the data signal component comprises a preamble field of a data packet or of a control packet.

9. The method of claim 1, further comprising at least one of the following tasks based on the interference-mitigated receive signal:
frame detection;
frequency offset estimation; and
synchronization.

10. The method of claim 1,
wherein the estimate of the interference signal component is determined such that leakage of the data signal component into the estimate of the interference signal component is prevented.

11. A device configured to receive a receive signal comprising a periodic data signal component and a periodic interference signal component, the device comprising:
an averager configured to determine an average value by averaging over sub-samples of the receive signal, wherein the average value is independent of at least one sub-sample of the receive signal having a same phase as a particular sample of the receive signal;
an estimator configured to determine for the particular sample of the receive signal an estimate of the interference signal component based on the average value;
a subtractor configured to subtract the estimate of the interference signal component from the particular sample of the receive signal to provide an interference-mitigated receive signal; and
a correlator configured to correlate the interference-mitigated receive signal with a correlation sequence.

12. The device of claim 11, further comprising:
a first number of branches, wherein the first number corresponds to a first number of samples per period of the interference signal component; and
a first switch configured to switch the receive signal into the first number of branches to provide a first number of first sub-sampled receive signals.

13. The device of claim 12, wherein each of the first number of branches comprises:
a second number of sub-branches; and
a second switch configured to switch the first sub-sampled receive signal of the respective branch into the second number of sub-branches to provide a second number of second sub-sampled receive signals.

14. The device of claim 13, wherein each of the second number of sub-branches comprises an averaging circuit configured to provide an average of the second sub-sampled receive signal switched to the respective sub-branch.

15. The device of claim 14, wherein each of the first number of branches comprises an adder configured to add all averages provided by the sub-branches of the respective branch except an average corresponding to the second sub-sampled receive signal having a same phase as the particular sample of the receive signal.

16. A method, comprising:
receiving, by a receiver, a receive signal comprising a data signal component and a periodic spur signal component, wherein the spur signal component comprises N samples per period;
decimating, by a decimator, the receive signal into N branches;
re-decimating, by the decimator, the decimated receive signal into K sub-branches;
estimating, but an estimator, the periodic spur signal component per sub-branch to provide K first spur estimates per branch; and
estimating, by the estimator, the periodic spur signal component per branch based on averaging all first spur estimates of the respective branch except the first spur estimate corresponding to a same phase as the receive signal.

17. The method of claim 16, further comprising:
subtracting, by a substrator, the estimated periodic spur signal component from the receive signal.

18. The method of claim 16, wherein estimating the periodic spur signal component per sub-branch is performed by using one of an online spur estimation and an offline spur estimation.

19. The method of claim 16, wherein estimating the periodic spur signal component per sub-branch is performed by using a filter.

20. The method of claim 1, wherein a fundamental frequency of the interference signal component is a harmonic of a fundamental frequency of the data signal component.

21. The device of claim 11, wherein a fundamental frequency of the interference signal component is a harmonic of a fundamental frequency of the data signal component.

* * * * *